D. M. WRIGHT.
ANIMAL TRAP.
APPLICATION FILED FEB. 20, 1914.
1,131,306.
Patented Mar. 9, 1915.
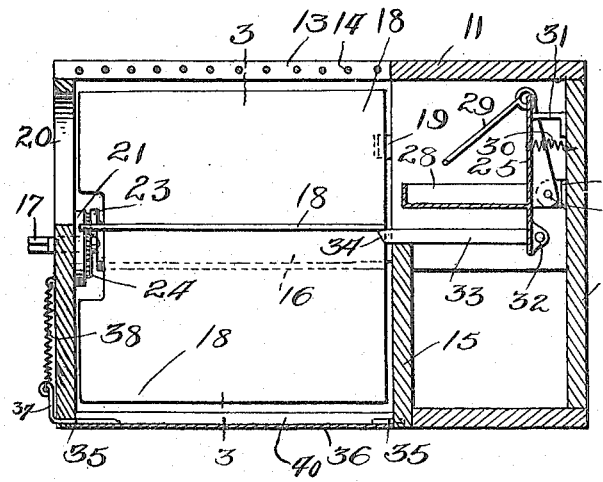
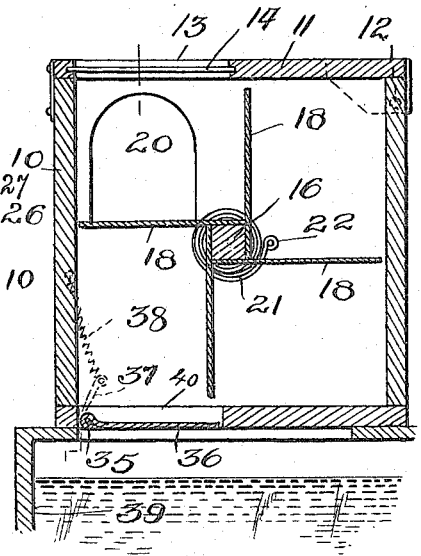
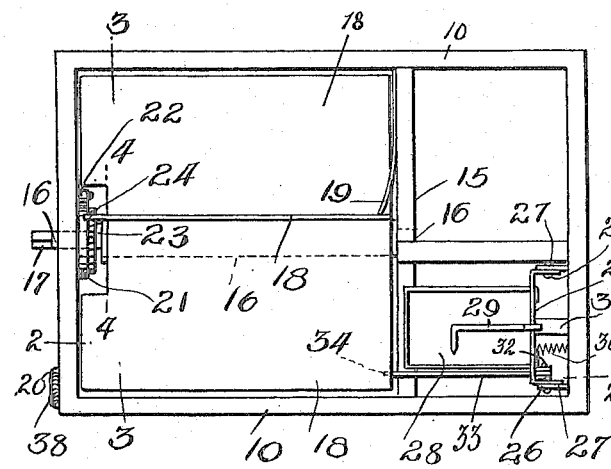
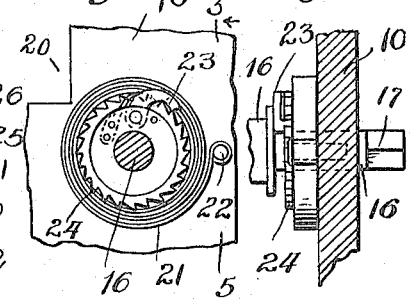
Inventor
D. M. Wright
Witnesses

UNITED STATES PATENT OFFICE.

DAVID M. WRIGHT, OF BERGHOLZ, OHIO.

ANIMAL-TRAP.

1,131,306.

Specification of Letters Patent.

Patented Mar. 9, 1915.

Application filed February 20, 1914. Serial No. 819,992.

*To all whom it may concern:*

Be it known that I, DAVID M. WRIGHT, citizen of the United States, residing at Bergholz, in the county of Jefferson and State of Ohio, have invented certain new and useful Improvements in Animal-Traps, of which the following is a specification.

This invention relates to improvements in animal traps, and has for one of its objects to improve the construction and increase the efficiency and utility of devices of this character.

Another object of the invention is to provide a simply constructed trap in which a spring actuated mechanism is employed releasable by actuating a bait trigger which plunges the animal into a receptacle and automatically resets the trap.

With these and other objects in view the invention consists in certain novel features of construction as hereinafter shown and described and then specifically pointed out in the claims; and in the drawings illustrative of the preferred embodiment of the invention—

Figure 1 is a plan view of the improved device with the cover removed. Fig. 2 is a section on the line 2—2 of Fig. 1 with the cover in position. Fig. 3 is a transverse section on the line 3—3 of Fig. 2. Fig. 4 is an enlarged section on the line 4—4 of Fig. 1 illustrating the construction of the operating spring for the rotating trapping device. Fig. 5 is a section on the line 5—5 of Fig. 4.

Corresponding and like parts are referred to in the following description and indicated in all the views of the drawings by the same reference characters.

The improved trap comprises a casing represented as a whole at 10 and preferably oblong in outline and having a closure 11 preferably hinged at 12 and with an opening represented at 13, the opening being preferably guarded by transverse wires or rods 14. The opening 13 is formed through a portion of the top 11 only as hereinafter described.

Formed in one corner of the casing is an L-shaped vertical partition 15, which thus forms the interior of the casing into a relatively large chamber and a relatively small chamber. Mounted for rotation within the relatively large chamber of the casing is a drum or shaft 16 which extends through one end of the casing and is provided with a square terminal 17 to receive a winding key. Attached to the square portion of the shaft 16 are leaves or plates 18, preferably four in number, and extending at their outer edges in relatively close proximity to the front and top of the casing. By this arrangement, as shown in Fig. 3, two of the plates 18 are disposed in vertical position, while the other plates are disposed in horizontal position normally. Attached to one of the walls of the partition 15 is a stop spring 19 which engages the rear face of the upper vertical plate 18 and thus prevents retrograde movement of the shaft 16 while at the same time permitting the shaft to be freely rotated in one direction. An opening 20 is formed in one end of the casing to provide means for the animal to enter the casing, and one of the horizontally disposed leaves 18 is arranged preferably level with the lower end of the opening 20 while the upper vertical leaf 18 cuts off access to the casing at one side, so that the entering animal is confined in the space between the cover 13 and the upper vertical plate 18 and one of the horizontal plates 18 as shown.

The opening 13 is located above the animal receiving portion of the interior only as represented in Figs. 2 and 3, so that light will freely pass to the animal receiving portion of the device, while at the same time the rods 14 prevent the escape of the animal through the opening.

A coil spring 21 is connected at its inner end to a hub on the shaft 16 and at its outer end to the adjacent wall of the casing 10 as represented at 22. A backing ratchet device is associated with the shaft 16 to prevent retrograde movement of the shaft. The backing ratchet device comprises a ratchet wheel 24 to which the inner end of the spring is attached, and a pawl 23 engaging the ratchet and pivoted to a disk which is, in turn, connected to the shaft 16. The spring is so arranged that when a winding key is applied to the terminal 17 of the shaft and rotated, power will be stored in the spring which operates to rotate the shaft and its blades 18 in one direction but said blade being prevented from retrograde movement by the spring 19, as before stated. A bait carrying trigger device is arranged to engage the spring controlled blades 18 and the shaft 16 and consists of a standard 25 pivoted at 26 to the casing, preferably by brackets 27 and with a bait receiving pan 28 extending from the bracket. A bait receiving hook 29 is also preferably connected to the upper end of the standard. The standard is retained yieldably in one position by a spring 30 which holds the standard against a stationary stop 31. The standard extends below the pivot 26, and pivoted at 32 to the lower end of the standard is a trigger member 33 which projects at its outer end at 34 for a short distance beneath the edge of the adjacent leaf 18, as represented in Figs. 1 and 2. The trigger device is so arranged that when the spring 30 holds the standard against the stop 31 the member 33 will be projected by its terminal 34 beneath the blade 18, which, for the time being, is in alinement with the bottom of the opening 20.

While as previously indicated, either the pan 28 or the hook 29 may be selectively employed to support the bait, being each operatively connected with the standard 25, it will be noted that the pan 28 is arranged below the hook 29 and in such position that should an animal, in any instance where the hook 29 is employed to support the bait, succeed in pulling the bait loose from the hook, the bait would, under normal conditions, fall into the pan 28. Thus, even though the member 33 were not released through the action of the animal in pulling the bait loose from the hook 29, there would still exist a chance that the animal would, in attempting to remove the bait from the pan 28 depress the said pan at its outer end and consequently actuate the trigger. It will therefore be seen that while I employ bait holding devices which, in their construction are each especially adapted for a particular purpose, the arrangement of the said devices relative to each other also has an important function.

Formed in the bottom of the casing 10 below the line of the opening 20 is an opening 40, and pivoted at 35 within this opening is a trapdoor device 36. Extending from the member 36 is an arm 37 having a spring 38 attached and operating to retain the trapdoor device yieldably in closed position, as represented in Fig. 3. The spring 38 will be relatively weak so that a comparatively light weight or pressure applied to the upper face of the member 36 will cause the latter to swing upon its pivot 35. The casing 10 is designed to be disposed over a suitable receptacle which may contain water for destroying the animals, or the receptacle may be in the form of a cage to preserve the trapped animals alive as may be preferred. By this arrangement it will be obvious that so long as the spring 30 operates to maintain the member 33—34 in engagement with the adjacent plate 18 the shaft 16 will be prevented from rotation.

With a device thus constructed the operation is as follows: With some species of animals loose bait is employed in the pan 28, but with other animals which are cautious and cunning the hooked pull device 29 will be supplied with bait which will require the animal to pull upon the bait. The animal entering through the opening 20 and attempting to remove the bait either by pressing downwardly upon the pan 28 or pulling upon the member 29, will cause the standard 25 to rock upon its pivot 27 and thus draw the terminal 34 of the member 33 from engagement with the adjacent plate 18 and thus release the shaft 16 when the spring 21 will immediately rotate the shaft and plunge the animal upon the trapdoor 34 which will yield and drop the animal into the receptacle 39. In the meantime, the animal will be caused to release its hold upon the trigger device, when the spring 30 will immediately return the member 33—34 to its outward position when the upper vertical blade 18 will be caught by the terminal 34 and the further rotation of the shaft prevented. By this arrangement the various blades 18 will be caused to consecutively assume the position shown in Fig. 3, and thus reset the trap after each operation, and the resetting will continue so long as any tension remains in the spring.

The improved device is simple in construction, can be inexpensively manufactured of any required material and of any required size to trap animals of different sizes or species.

Having thus described the invention, what is claimed as new is:

1. In an animal trap, a movable platform, and a trigger device arranged to coact with the platform, said trigger device including a standard pivoted intermediate its ends, a trip member operatively connected to said standard upon one side of the pivot point thereof and normally engaging the platform, and bait supporting devices secured to the standard upon the opposite side of its pivot point, said bait supporting devices being arranged in spaced relation and one thereof being disposed to normally catch and retain a bait falling from the other of said bait supporting devices.

2. In an animal trap, a movable platform, and a trigger device arranged to coact with the platform, said trigger device including a standard pivoted intermediate its ends, a trip member operatively connected to the standard upon one side of its pivot point and normally engaging the platform, a bait pan secured to the standard upon the opposite side of its pivot point, and a bait hook carried by the standard and supported thereby in spaced relation above the bait pan whereby bait falling from the bait hook will normally be caught and retained by the bait pan.

In testimony whereof I affix my signature in presence of two witnesses.

DAVID M. WRIGHT. [L. S.]

Witnesses:
MAGGIE CARSON,
S. G. CARSON.

Copies of this patent may be obtained for five cents each, by addressing the "Commissioner of Patents, Washington, D. C."